United States Patent

[11] 3,609,388

| [72] | Inventors | Stuart F. Hemmenway<br>Scotia;<br>William H. Turner, Jr., Schenectady, both of N.Y. |
|---|---|---|
| [21] | Appl. No. | 49,317 |
| [22] | Filed | June 24, 1970 |
| [45] | Patented | Sept. 28, 1971 |
| [73] | Assignee | General Electric Company |

[54] AUTOMATIC PARALLELING CIRCUIT
10 Claims, 3 Drawing Figs.

[52] U.S. Cl. .................................................. 307/87,
307/57, 307/130
[51] Int. Cl. ................................................ H02j 3/38
[50] Field of Search .......................................... 307/87, 85,
86, 57, 130

[56] References Cited
UNITED STATES PATENTS

| 2,785,318 | 3/1957 | Eisengrein et al. | 307/87 |
| 2,817,024 | 12/1957 | Karlicek | 307/87 |
| 2,838,685 | 6/1958 | Stineman | 307/87 |
| 2,840,725 | 6/1958 | King et al. | 307/87 |
| 2,862,111 | 11/1958 | Richards | 307/87 |
| 3,248,608 | 4/1966 | Farkas et al. | 307/87 |
| 3,343,000 | 9/1967 | Bobo | 307/57 |

*Primary Examiner*—Robert K. Schaefer
*Assistant Examiner*—William J. Smith
*Attorneys*—John J. Kissane, James C. Davis, Jr., Frank L. Neuhauser, Oscar B. Waddell and Joseph B. Forman ABSTRACT: A circuit for automatically paralleling AC generators. Upon detecting a first, small differential voltage between a main bus and the corresponding terminal of an off-line generator a first relay is actuated, applying the differential voltage to a second relay. When the differential voltage attains a second, higher value a circuit for energizing mechanical contactors is partially completed. As the differential voltage subsequently lessens, the first relay drops out, completing the energization of the circuit and the mechanical contactors. The dropout voltage of the first relay is such that the increment of time necessary for the differential voltage to fall from the first relay dropout voltage to zero is substantially the same as the time necessary for the actuation of the contactors.

AUTOMATIC PARALLELING CIRCUIT

BACKGROUND OF THE INVENTION

The present invention relates to electrical interconnection systems and, more particularly, to means for connecting preselected voltage sources to a main line or bus.

In order to avoid voltage disturbances on a line supplying AC power, which may result in damage to electrical equipment drawing power therefrom it is desirable to connect additional sources of power to the line when the differential between source voltage and line voltage is quite small, preferably zero. This requirement is particularly difficult to implement in the case of a plurality of independently driven polyphase generators since generators operating under load may produce AC of a different frequency than that produced by the unloaded, off-line generators.

Many systems have been devised to connect off-line generators to a load circuit, while minimizing line disturbances. Devices termed "synchroscopes" are sometimes provided to indicate the relative phase relationship between the output voltage of an off-line generator and line voltage, the generator to be put on line either manually or automatically when the synchroscope indicates the existence of a minimum phase differential. other devices utilizing voltmeters have been developed in an attempt to provide "bump-free" switching whereby some minimal voltage differential must be present before the unloaded generator is put on line. Other systems utilizing electronic devices and complex circuitry have been devised to achieve the same end, but the complexity and expense of such devices often render them impractical. Further, the reliability of many of the electronic devices adaptable to such applications leaves much to be desired when compared to available electromechanical devices.

The present invention teaches a circuit which accomplishes the connection of a preselected generator to a line at a time when the voltage differential therebetween approaches zero, thereby substantially precluding any transient disturbance of line voltage due to the introduction of the new generator. Once the new generator is put on the line, it shares the load equally with other online generators and will therefore produce AC power at a frequency common to the other, loaded generators. The present invention does not rely upon complex electronic circuitry or electronic devices which may require significant amounts of maintenance, but its objects are achieved trough the use of a single stage of electromechanical apparatus which acts as a common switching means for a plurality of off-line generators.

In accordance with the invention, first, second, and third relays are provided. The first relay is designed to operate when the differential between off-line generator voltage and line voltage attains a first, predetermined value. Upon operation, this relay opens a first set of contacts, disabling the gating circuit of a main switch, and closes a second set of contacts which applies the differential voltage to the winding of a second relay. As the differential voltage increases to a second predetermined value the second relay is operated, locking in a self-energizing third relay which in turn partially completes the aforementioned gating circuit. As the differential voltage declines, the second-mentioned relay drops out, leaving the third relay locked in. Further decline of the differential voltage causes the first relay to drop out, closing the first-mentioned contacts and completing the gating circuit. Upon energization of the main switch by the now-completed gating circuit, a set of electromechanical contactors are operated to connect the off-line generator to the line. The dropout point of the first relay is adjusted so that the time necessary for the differential voltage to decrease from the dropout level of the first relay to zero is substantially the same time increment which is required for the main switch to operate the contactors. One of the contactors acts to shunt the main switch, providing self-energization and locking the contactors closed. The control circuit may now be decoupled from the generator and recoupled to another off-line generator, ready to couple this generator to the main line or bus when needed.

The aforementioned system combines the reliability and simplicity of commercially available electromechanical devices with a "fail-safe" feature in that a predetermined differential between line and generator voltage is first necessary to "set" the first relay before the relay can subsequently energize a second relay and then drop out, completing the gating circuit and putting the generator on line. Should any of the relays be inoperative, the necessary sequence of relay operation will be broken and the system will not operate.

It is therefore an object of the present invention to provide a simplified system for automatically paralleling AC generators.

It is a further object to provide a simplified automatic paralleling circuit utilizing standard electromechanical components.

It is still a further object of the invention to provide an electromechanical paralleling circuit which provides fail-safe operation.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment, taken in connection with the accompanying drawings, in which:

DESCRIPTION OF THE PREFERRED EMBODIMENT

Figure 1:
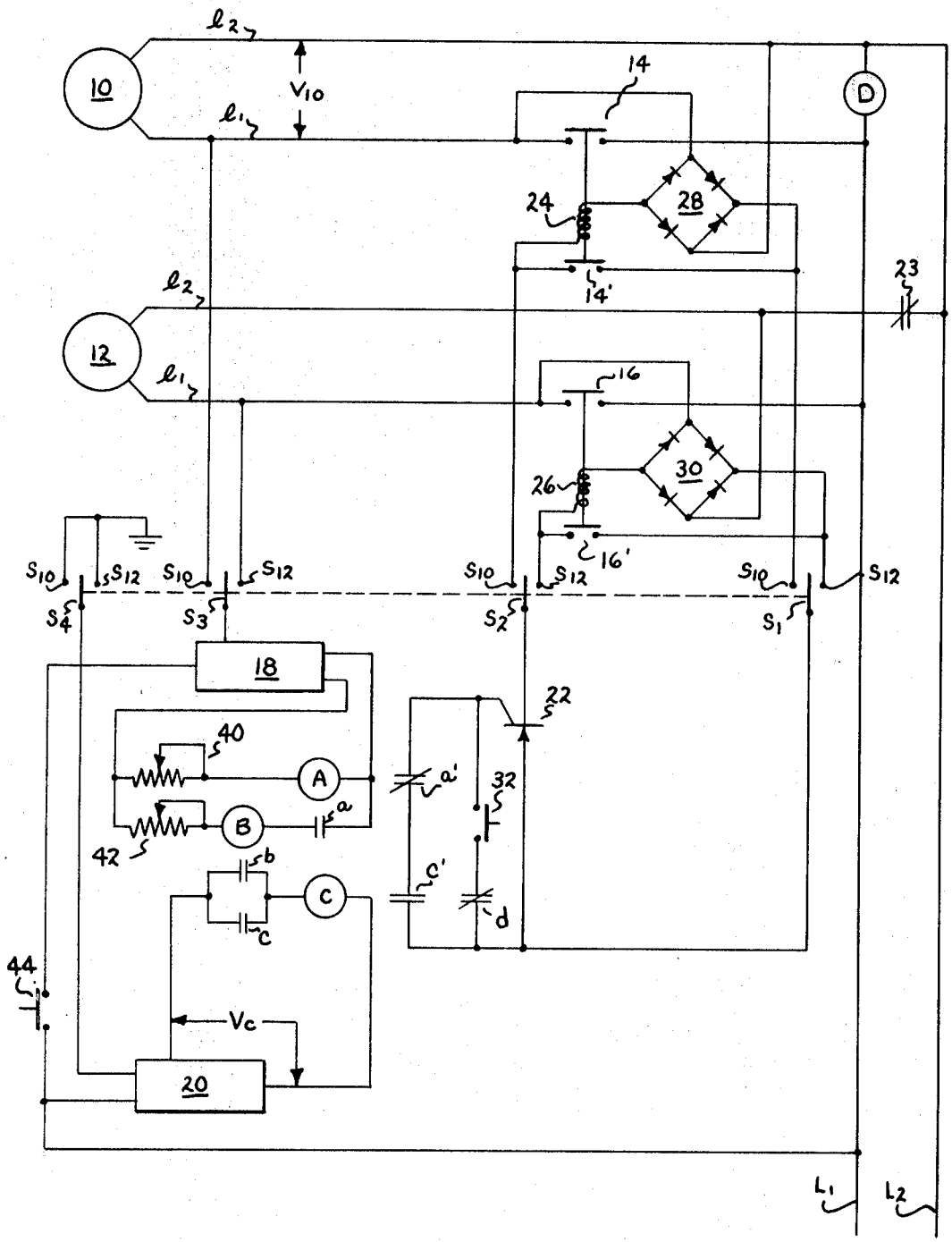
FIG. 1 is a schematic diagram of a simplified form of the inventive circuit.

FIG. 1 shows a schematic diagram of a first embodiment of the inventive system, showing a pair of AC generators 10 and 12 each having lines $1_1$ and $1_2$ coupled to corresponding terminals thereof and which may be selectively coupled to main lines $L_1$ and $L_2$, and thence to a load (not shown), by contactor assemblies generally indicated at 14 and 16, respectively. Taking lines $L_2$ and $1_2$ to be common or "neutral," it is desired that the voltage of lines $1_1$ of generator 10 or 12 be of the same magnitude as the voltage of line $L_1$, hereinafter referred to as $V_L$, in order to have ideal "bump-free" coupling of the off-line generator to the load. To this end, first voltage supply 18 is provided in conjunction with relays A and B. The contacts being operated by these relays are indicated at $a, a'$, and $b$, the contacts being operated by relays having corresponding letter designations. Second voltage supply 20 provides a predetermined voltage $V_c$, derived from line $L_1$, for energizing relay C upon closure of contact $b$. Multiple contact gang switches $S_1$–$S_4$ are provided for coupling the selection system to preselected ones of the generators. A main switch comprising an SCR 22 serves to complete a circuit including switches $S_1$, $S_2$ and relay windings 24 or 26 of contactor assemblies 14 or 16 respectively dependent upon the position of gauged switches $S_1$ and $S_2$. While in the preferred embodiment an SCR is provided, it will be recognized by those skilled in the art that other switching means could be substituted therefor. A pilot relay actuated by contacts $a'$ and $c'$ could be used, or larger relays utilized for those indicated at A and C and contacts $a'$ and $c'$ used in place of SCR 22 to conduct current to relay windings 24 or 26. Power for energizing the relay windings 24, 26 is derived from the terminals of the generator with which the relay is associated, and is converted to DC by means of rectifiers 28 or 30 respectively. If desired, a relay which operates on AC could be provided, in association with bidirectionally conductive triggerable means for allowing the AC current to pass through the relay. Further, relay D is disposed between lines $L_1$ and $L_2$ for operating contacts $d$ which, in combination with manually operated switch 32, provide means for gating SCR 22 when no voltage is present in line $L_1$.

OPERATION

In order to describe the operation of the inventive system it will initially be assumed that no generators are coupled between lines $L_1$ and $L_2$. It will further be assumed that generator 10 is to be the first generator to be coupled across the lines. When generator 10 is operative, a voltage $V_{10}$ is provided between lines $1_1$ and $1_2$ extending from the terminals of the said generator. Switches $S_1$–$S_4$ are positioned so as to connect with those contacts denoted $S_{10}$, indicating that the switches of the selection system are positioned so as to operate the contactor assembly of generator 10.

Voltage drawn from line $1_1$ of generator 10 is applied to rectifier 28, and thus is available for providing direct current through relay winding 24 in order to operate contactor assembly 14. The series combination of $S_1$, $S_2$ and SCR 22 complete the contactor relay circuit. SCr 22, however, is not in a conductive state and, since the selection system normally draws it power from line $L_1$, the system is not yet operative. In this instance, switch 32 may be manually engaged so as to complete the gate circuit of SCR 22. With SCR 22 energized, current from rectifier 28 flows through the contactor relay circuit, energizing relay winding 24 and actuating contactor assembly 14. This places generator 10 on line, and simultaneously closes auxiliary contacts 14' which shunt switches $S_1$, $S_2$ and SCR 22, allowing the circuit to remain completed when switches $S_1$ and $S_2$ are subsequently opened. The voltage appearing on the main lines now energizes relay D, opening contacts $d$ and disabling the manual gating circuit for SCR 22.

With generator 10 on line, switches $S_1$–$S_4$ are reorientated to connect with contacts $S_{12}$ which are utilized for actuating contactor assembly 16 which are utilized for actuating generator 12 on line. It will be seen that as soon as switch $S_4$ becomes coupled to a point of ground potential, voltage $V_{L_1}$ energizes second voltage supply 20 to provide DC voltage $V_c$ across contacts $b$ and $c$ which lie in series with relay C.

To initiate the operation of the selection system, master switch 44 is closed, applying voltage $V_{L_1}$ to a first input terminal of first voltage supply 18. Voltage $V_{1_1}$ is supplied to a second input terminal of voltage supply 18 from $1_1$ of generator 12 by means of switch $S_3$. The differential voltage resulting from the subtraction of $V_{L1}$ from $V_{L1}$ is applied to a first series circuit comprising relay A and potentiometer 40, and to a second series circuit comprising potentiometer 42, relay B, and relay contacts $a$. When the voltage $(V_{L_1} - V_{1_1})$ provided by supply 18 reaches a first predetermined magnitude, relay A operates, closing normally open contacts $a$ and opening normally closed contacts $a'$ to disable the gate circuit of SCR 22. With contacts $a$ closed, voltage $(V_{L_1} - V_{1_1})$ is not applied to the series combination of potentiometer 42 and relay B. Potentiometer 42 is adjusted such that the voltage $V_B$ required to operate relay B is substantially the maximum possible differential between $V_{L_1}$ and $V_{1_1}$, this condition obtaining when the voltage supplied by generator 12 is substantially in phase opposition to line voltage $V_{L_1}$. Upon the appearance of this maximum voltage differential $V_B$, relay B operates, closing contacts $b$ which lie in series with the winding of relay C. Voltage $V_C$ now impels current through closed contacts $b$, energizing relay C. Normally open contacts $c$ and $c'$ are both closed by the operation of relay $c$, contacts $c'$ acting to complete, or enable, a portion of the gating circuit of SCR 22. It will now be seen that relay C is self-energizing in that contacts $c$ direct current to the winding of relay C even after relay B drops out and contacts $b$ open. As differential voltage $(V_{L_1} - V_{1_1})$ decreases below $V_B$, relay B drops out opening contacts $b$. As the differential voltage declines still further, it eventually decreases beyond the dropout point $V_A$ of relay A. When this occurs, contacts $a$ and $a'$ are operated, $a'$ closing and, along with contacts $c'$, completing the gate circuit for SCR 22. Current derived from rectifier 30 and from $1_1$ of generator 12 now flows through switches $S_1$, SCR 22, $S_2$ and relay winding 26, operating contactor assembly 16. Auxiliary contacts indicated at 16' then shunt switches $S_1$, $S_2$ and SCR 22, allowing contactor assembly 16 to remain energized by current from rectifier 30 after the selection system has been disconnected. When at some later time it is desired to remove generator 12 from the main lines, deenergization of the generator and opening of normally closed contacts 23 by a manually controlled switch (not shown) will remove voltage from rectifier 30, causing current flow in relay winding 26 to cease and allowing contactor assembly 16 to drop out. Contacts 23 then are allowed to close thereby permitting subsequent paralleling of generator 12 into the main lines under the control switches $S_1$–$S_4$.

Figure 2:
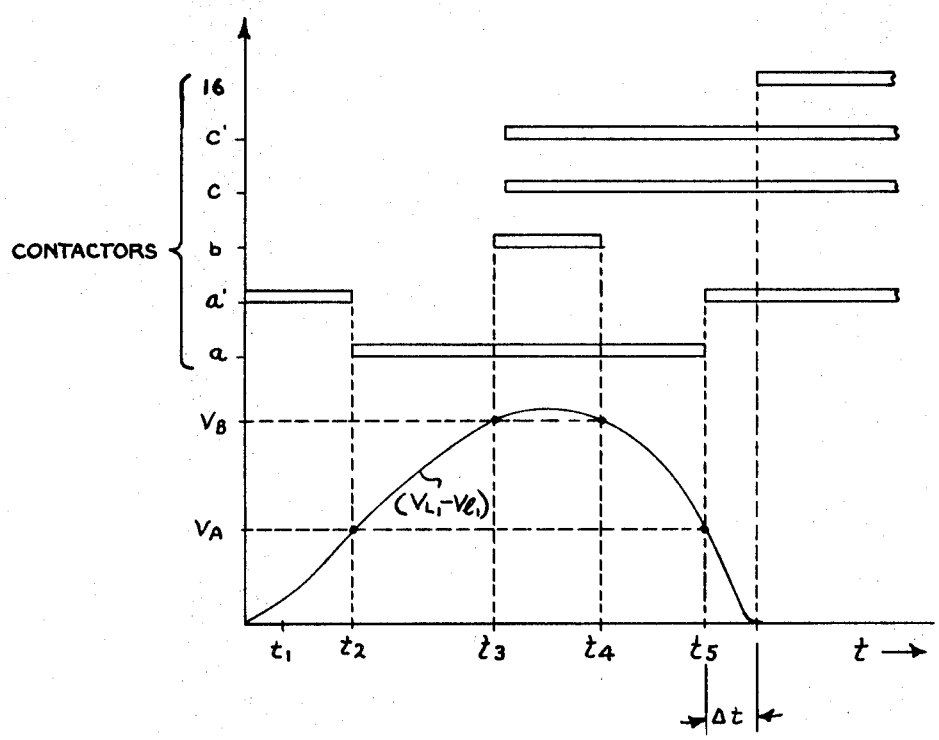
FIG. 2 is a graph illustrating the operation of the inventive circuit.

FIG. 2 illustrates the action of the various relays as a function of time. Voltage $(V_{L_1} - V_{1_1})$, outputted by first voltage supply 18, is represented by the curve at the lower portion of the Figure. $V_A$, the voltage at which relay A is actuated, is adjusted by means of potentiometer 40 to a value which is significantly less than the maximum of $(V_{L_1} - V_{1_1})$, as will be hereinafter described. $V_B$, the voltage at which relay B is actuated, is adjusted by means of a potentiometer 42 to a value which is slightly less than the maximum of $(V_{L_1} - V_{1_1})$. Under quiescent conditions, before the selection system is actuated, it will be understood that only normally closed relay contacts $a'$ are closed. This condition is indicated by the solid bar aligned with the notation $a'$ on the vertical axis of FIG. 2. When master switch 44 is closed at some time $t_1$, voltage $(V_{L_1} - V_{1_1})$ is applied to the terminals of supply 18. When the voltage thus obtained attains a value of $V_A$ at some time $t_2$, relay A is actuated causing contacts $a'$ to open (indicated by the termination of the solid bar aligned with the notation $a'$) and contacts $a$ to close (indicated by the commencement of the bar aligned with $a$). With contacts $a$ closed, voltage $(V_{L_1} - V_{1_1})$ is applied to potentiometer 42 and the winding of relay B. When differential voltage attains a level $V_B$ at a later time $t_3$, relay B is actuated closing contacts $b$ and energizing relay C. Shortly thereafter contact $c$ and $c'$ close, indicated by the commencement of the solid bars aligned with $c$ and $c'$. As voltage $(V_{L_1} - V_{1_1})$ decreases below $V_B$, relay B drops out allowing contacts $b$ to open at time $t_4$. It will be noted, however, that due to the self-energizing connection of relay C, relay C does not drop out at this time but stays energized by means of contacts $c$ which continue to pass current from first voltage supply 20. At some later time $t_5$, the voltages $(V_{L_1} - V_{1_1})$ diminishes to $V_A$ deenergizing relay A whereupon contacts $a$ open to isolate relay B, and contacts $a'$ close, completing the gating circuit for SCR 22. The circuit for energizing windings 26 for actuating contactor assembly 16 is now completed and after some time delay $\Delta t$ inherent in the operation of the contactor assembly, the contacts close, putting generator 12 on the line. In the illustrated embodiments, time delay $\Delta t$ consists almost entirely of that time which is needed to actuate the relatively heavy contactor assemblies used to switch generator current. Should SCR 22 be replaced by a pilot relay, or should relays A and C be replaced by larger, heavier devices so that contacts $a'$ and $c'$ rather than SCR 22 conduct the current necessary to energize the contactor relay windings, the time delay $\Delta t$ will be lengthened by the time required to operate the additional or modified relays.

It will be appreciated that for a given rate of change of differential voltage $(V_{L_1} - V_{1_1})$, voltage $V_A$ can be selected such that contactor assembly 16 is energized some predetermined $ti\Delta t$ before the differential voltage becomes substantially zero. While the time$\Delta t$ should ideally correspond to the time required for SCR 22 to energize a contactor assembly, it will be recognized that the differential voltages $(V_{L_1} - V_{1_1})$ is a function of several parameters, such as the phase relationship of the generators, the size of the load, and so forth. For this reason, an optimum value $V_A$ must be selected. That value is advantageously selected for the "worst case," which occurs when the online generator or generators are loaded to the fullest extent which will occur in a given application. In this case, the magnitude and phase differential between the voltage of the loaded generators and that of an unloaded generator will be the greatest that may be expected to occur.

With a plurality of lightly loaded generators on line, when it is desired to add a further generator the time differential $\Delta t$ which is required for the decreasing differential voltage to decline from $V_A$ to zero will be somewhat longer. However, in this circumstance the change in line voltage will be small and transient disturbances in the voltage seen by the load may be considered negligible. It will thus be appreciated by those skilled in the art that while the system does not provide for the paralleling of additional generators precisely at zero differential voltage under all conditions, the system operates satisfactorily when adjusted for optimum results as set forth above, eliminating unwanted transient disturbances under the conditions when they are most likely to occur. Such disturbances as will occur with use of the invention may for all practical purposes be considered negligible and are more than compensated for by the simplicity and reliability afforded by the present system. Fall-safe switching is provided, using only three relays and a single SCR; moreover, the system may be selectively connected to any of a plurality of off-line generators, and can be disconnected as soon as a generator is put on line thereby eliminating the necessity for providing duplicate systems.

Figure 3:
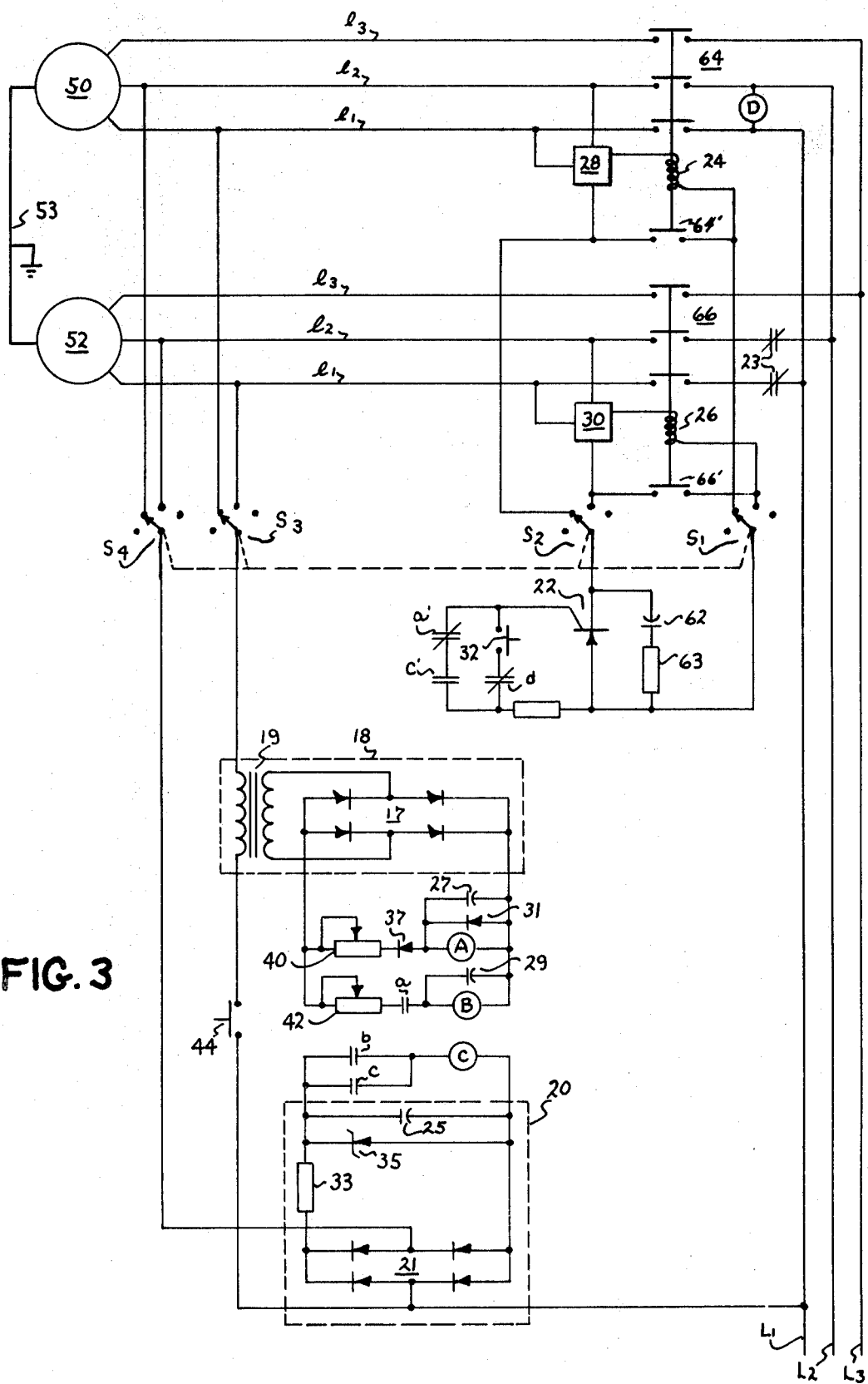
FIG. 3 is a schematic diagram of the inventive system further illustrating the components used therein.

FIG. 3 illustrates a further embodiment of the present invention, and discloses the components constituting a second form of the invention selection system. A pair of polyphase generators 50 and 52 are each provided with lines $1_1$, $1_2$ and $1_3$ extending from corresponding phase windings thereof for connecting said generators to main power lines $L_1$, $L_2$ and $L_3$. Electrically neutral points of the polyphase windings of the generators are connected by means of neutral conductor 53. Contractor assemblies 64 and 66, actuated by relay windings 24 and 26 respectively, are provided to selectively connect the generators to the main lines. As explained above, relay winding D is connected across two of the main lines for activating contacts $d$ to open the gating circuit of SCR 22, after the contactor assemblies have been manually energized by means of switch 32 in order to put the initial generator on the line. Multiposition gang switches $S_1$–$S_4$ are provided to selectively couple the selection system to the desired off-line generator.

Power from line 1 for energizing relay winding C is supplied to one input terminal of a DC voltage source 20 which may advantageously include a diode bridge 21. Another input terminal is coupled though switch $S_4$ to line $1_2$ of a preselected one of the off-line generators. The phase difference between voltages $V_1$ 11 and $V_{1_2}$ provides an AC voltage therebetween which is rectified by the bridge, limited by means of a resistor 33 and zener diode 35, and filtered by a capacitor 25 to provide a smooth, predictable DC voltage to relay C and contacts $b$ and $c$ associated therewith.

In a similar fashion, first voltage source 18 is provided to supply voltage to relays A and B. Source 18 comprises a diode bridge 17 and transformer 19, the secondary winding of which extends between the input terminals of the bridge. The primary winding of transformer 19 is connected between main line $L_1$, and $1_1$ of that off-line generator which is to be coupled to the main lines. The current flowing through the primary windings of transformer 19 thus reflects the differential voltage between $L_1$ and $1_1$, or $(V_{L_1} - V_{1_1})$. Capacitors 27 and 29 are placed in shunt with relay windings A and B to prevent the contacts thereof from chattering. Diodes 37 and 31 are placed in series and shunt, respectively, with relay winding A. Diode 37 provides a defined voltage level for insuring rapid actuation of relay A, which is designed to operate at the forward voltage drop of the diode; while diode 31 serves an an overvoltage protection means. A manually operated master switch 44 serves to couple the primary winding of transformer 19 to main line $L_1$ when it is desired to institute the operation of the invention system.

As in the embodiment of FIG. 1, an SCR 22 is the switching means utilized for completing the circuit energizing the contactor assemblies 64 or 66 which put the generators 50 and 52 on the line. An RC circuit composed of capacitor 62 and resistor 63 serve to protect against the inadvertent gating of the SCR by transient voltage phenomena in the contactor assembly circuits.

The operation of the circuit of FIG. 3 is essentially the same as that illustrated in FIG. 1 above. Since polyphase generators are provided, however, it is feasable to use line-to-line voltages for energizing second voltage supply 20, which serves to further the integrity of the system in that it ensures that at least two phases of a generator must be operative before the generator can be put on line.

Initially, a DC supply voltage driven from voltage $(V_{L_1} - V_{1_2})$ is applied across relay C and open contacts $b$ and $c'$. When master switch 44 is closed, differential voltage $(V_{L_1} - V_{1_1})$ is applied across the primary winding of transformer 19, the resulting current being rectified and applied to the series combination of potentiometer 40 and the winding of relay A. As the differential voltage increases, relay A is energized, operating contacts $a$ and $a'$, thus allowing the differential voltage to be impressed across potentiometer 42 and the winding of relay B. When relay B is energized, contacts $b$ close to energize relay C. Contacts $c$ and $c'$ now close, locking in relay C and completing a first portion of the gating circuit of SCR 22. As the differential voltage declines, relays B and A drop out, contacts $b$ and $a$ open and contacts $a'$ close, completing the gating circuit and energizing SCR 22. DC current from rectifier 28 or 30 now flows through relay winding 24 or 26, dependent upon the position of switches $S_1$ and $S_2$, connecting generator lines $1_1$–$1_3$ to the main lines $L_1$–$L_3$ and shunting switch $S_2$, SCR 22 and switch $S_1$ by means of auxiliary contactor elements 64' or 66'. Selecting switches $S_1$–$S_4$ may now be placed in a new position to select another off-line generator preparatory to its energization. It will be seen that as soon as switches $S_3$ and $S_4$ break contact, the selection system is deenergized, and relay C drops out.

From the above it will be clear that by means of this invention there is provided a selection system which relies upon the differential between line voltage and the voltage of an off-line generator for first setting, and then energizing, electromechanical switching means. While there have been shown and described presently preferred embodiments of this invention, it will be understood that various changes may be made in circuit configuration and in the components without departing from the spirit and scope of the invention, particularly as set forth in the appended claims.

What is claimed as new and desired to be secured by Letters Patent of the United States is:

1. A selection system for coupling a preselected alternating current generator to main lines carrying alternating current, comprising:

contactor means for coupling the terminals of said generator to corresponding ones of said lines;

first switch means for energizing said contactor means, said first switch means including first and second portions;

means for supplying a first, variable voltage, including means for comparing the voltage of one of said generator terminals with the voltage of a corresponding one of said lines and producing a voltage output representative of the difference therebetween;

means for supplying a second voltage;

second, third and fourth switch means;

i. said second switch means being connected across said fist voltage supply, said second switch means being energizable at a first, lower voltage to disable said first portion of said first switch means and to connect said third switch means across said first voltage supply;

ii. said third switch means being energizable at a second, higher voltage to connect said fourth switch means across said second voltage supply;

iii. said fourth switch means being energizable by said second voltage supply means to enable said second portion of said first switch means;
iv. said second switch means becoming deenergized when said first voltage supply means subsequently provides a voltage less than said first, lower voltage whereby said first portion of said first switch means is enabled.

2. A selection system for coupling a preselected alternating current generator to main lines carrying alternating current, comprising:
   contactor means for coupling the terminals of said generator to corresponding ones of said lines;
   gated switch means for energizing said contactor means, said gated switch means including a gating circuit for energizing said gated switch means, said gating circuit having first and second portions;
   means for supplying a first, variable voltage, including means for comparing the voltage of one of said generator terminals with the voltage of a corresponding one of said lines and producing a voltage output representative of the difference therebetween;
   means for supplying a second, constant voltage;
   first, second and third switch means,
   i. said first switch means being connected across said first voltage supply, said first switch means being energizable at a first, lower voltage to disable said first portion of said gating circuit and to connect said second switch means across said first voltage supply;
   ii. said second switch means being energizable at a second, higher voltage to connect said third switch means across said second voltage supply;
   iii. said third switch means being energizable by said second voltage supply means to enable said second portion of said gating circuit;
   iv. said first switch means becoming deenergized when said first voltage supply means subsequently provides a voltage less than said first, lower voltage whereby said first portion of said gating circuit is enabled.

3. A selection system as defined in claim 2 further including:
   means for shunting said gated switch means upon the energization of said contactor means; and
   fourth switch means for decoupling said selection system from said contactor means and from said one of said generator terminals.

4. A selection system as defined in claim 2 wherein said first, second and third switch means are relays.

5. A selection system as defined in claim 4 wherein said gated switch means is an SCR.

6. A selection system for coupling one of a plurality of polyphase generators to main lines carrying polyphase current, comprising:
   contactor means for coupling each of the phases of said generator to corresponding ones of said lines;
   first switch means for energizing said contactor means, said first switch means including first and second portions;
   means for supplying a first, variable voltage comprising means for comparing the voltage of one of said phases of said generator with the voltage of a corresponding one of said lines and producing a voltage output representative of the difference therebetween;
   means for supplying a second voltage;
   second, third and fourth switch means,
   i. said second switch means being connected across said first voltage supply means, said second switch means being energizable by a first, lower voltage to disable said first portion of said first switch means and to connect said third switch means across said first voltage supply;
   ii. said third switch means being energizable at a second, higher voltage to connect said fourth switch means across said second voltage supply;
   iii. said fourth switch means being energizable by said second voltage supply means to enable said second portion of said first switch means;
   iv. said second switch means becoming deenergized when said first voltage supply means subsequently provides a voltage less than said first, lower voltage whereby said first portion of said first switch means is enabled.

7. A selection system for coupling one of a plurality of polyphase generators to main lines carrying polyphase current, comprising:
   contactor means for coupling each of the phases of said generator to corresponding ones of said lines;
   gated switch means for energizing said contactor means, said gated switch means including a gate circuit for energizing said gated switch means, said gating circuit having first and second portions;
   means for supplying a first, variable voltage comprising means for comparing the voltage of one of said phases of said generator with the voltage of a corresponding one of said lines and producing a voltage output representative of the difference therebetween;
   means for supplying a second, constant voltage;
   first, second and third switch means,
   i. said first switch means being connected across said first voltage supply means, said first switch means being energizable by a first, lower voltage to disable said first portion of said gating circuit and to connect said second switch means across said first voltage supply;
   ii. said second switch means being energizable at a second, higher voltage to connect said third switch means across said second voltage supply;
   iii. said third switch means being energizable by said second voltage supply means to enable said second portion of said gating circuit;
   iv. said fist switch means becoming deenergized when said first voltage supply means subsequently provides a voltage less than said first, lower voltage whereby said first portion of said gating circuit is enabled.

8. A selection system as defined in claim 7 further including:
   means for shunting said gated switch means upon the energization of said contactor means; and
   fourth switch means for decoupling said selection system from said contactor means and from said one of said generator phases.

9. A selection system as defined in claim 7 wherein said first, second and third switch means are relays.

10. A selection system as defined in claim 9 wherein said gated switch means is an SCR.